United States Patent Office 3,574,701
Patented Apr. 13, 1971

3,574,701
PROCESS FOR PRODUCING ETHYLENICALLY UNSATURATED ALIPHATIC NITRILES
Naoya Kominami, Tokyo, Hitoshi Nakajima, Urawa-shi, and Nobuhiro Tamura, Tokyo, Japan, assignors to Asachi Kasei Kogyo Kabushiki Kaisha, Asaka, Japan
No Drawing. Continuation-in-part of application Ser. No. 489,750, Sept. 23, 1965. This application May 6, 1969, Ser. No. 822,300
Claims priority, application Japan, Oct. 15, 1964, 39/58,344
Int. Cl. C07c 121/04
U.S. Cl. 260—465.3                             5 Claims

ABSTRACT OF THE DISCLOSURE

Process for producing ethylenically unsaturated aliphatic nitriles of acrylonitrile, methacrylonitrile, crotonitrile, 1-cyano-butene-1, 2-cyano-butene-1, 2-cyano-butene-2 and 1-cyano-2-methyl-propene-1, by reacting an olefinic hydrocarbon containing 2 to 4 carbon atoms i.e. ethylene, propylene, normal butylene and isobutylene with hydrogen cyanide and oxygen or a molecular oxygen containing gas in the gaseous phase in the presence of a catalyst selected from the group consisting of the oxides of rhodium selected from the group consisting of RhO, $Rh_2O_3$, $RhO_3$ and $RhO_2$; the hydroxides of palladium and rhodium selected from the group consisting of $Pd(OH)_2$, $Pd(OH)_4$, $Rh(OH)_3$ and $Rh(OH)_4$; the chlorides of palladium and rhodium selected from the group consisting of PdCl, $PdCl_2$, $PdCl_3$, $PdCl_4$, $RhCl_2$ and $RhCl_3$; the bromides of palladium and rhodium selected from the group consisting of $PdBr_2$ and $RhBr_3$; the nitrates of palladium and rhodium selected from the group consisting of $Pd(NO_3)_2$ and $Rh(NO_3)_3$; $Pd(CN)_2$ and $Pd(OCOCH_3)_2$ at a temperature of 200° C.

CROSS-REFERENCE TO RELATED APPLICATIONS

This application is a continuation-in-part of U.S. application Ser. No. 489,750 filed Sept. 23, 1965, now abandoned.

BACKGROUND OF THE INVENTION (1) Field of the invention

This invention relates to a process for producing ethylenically unsaturated aliphatic nitriles by subjecting a gaseous mixture of an olefinic hydrocarbon containing 2 to 4 carbons, hydrogen cyanide and oxygen or a molecular oxygen containing gas to a gaseous phase catalyst reaction in the presence of a catalyst.

(2) Description of the prior art

Hitherto, there has been no commercial process according to which ethylenically unsaturated aliphatic nitriles can be prepared directly in a single step directly from an olefinic hydrocarbon containing 2 to 4 carbon atoms, hydrogen cyanide and oxygen by a gaseous phase catalytic reaction.

It is an object of the present invention to provide a process according to which ethylenically unsaturated aliphatic nitriles can be prepared directly in a single step by a gaseous phase catalytic reaction of an olefinic hydrocarbon containing 2 to 4 carbon atoms, hydrogen cyanide and oxygen or a molecular oxygen containing gas.

Other objects and advantages will become apparent from the following description.

SUMMARY OF THE INVENTION

According to the present invention an ethylenically unsaturated aliphatic nitrile is prepared by reacting an olefinic hydrocarbon containing 2 to 4 carbon atoms selected from the group consisting of ethylene, propylene, normal butylene and isobutylene with hydrogen cyanide and a gas consisting of oxygen and molecular oxygen containing gases in the gaseous phase in the presence of a catalyst selected from the group consisting of the oxides of rhodium selected from the group consisting of RhO, $Rh_2O_3$, $RhO_3$ and $RhO_2$; the hydroxides of palladium and rhodium selected from the group consisting of $Pd(OH)_2$, $Pd(OH)_4$, $Rh(OH)_3$ and $Rh(OH)_4$; the chlorides of palladium and rhodium selected from the group consisting of PdCl, $PdCl_2$, $PdCl_3$, $PdCl_4$, $RhCl_2$ and $RhCl_3$; the bromides of palladium and rhodium selected from the group consisting of $PdBr_2$ and $RhBr_3$; the nitrates of palladium and rhodium selected from the group consisting of $Pd(NO_3)_2$ and $Rh(NO_3)_3$; $Pd(CN)_2$ and $Pd(OCOCH_3)_2$ at a temperature of 200° C. to 500° C.

The present process may be represented by the following equation:

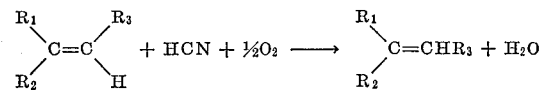

wherein $R_1$, $R_2$ and $R_3$ are independently selected from the group consisting of hydrogen, methyl and ethyl.

The olefinic hydrocarbons containing 2 to 4 carbon atoms which may be used as feedstocks according to the present invention include ethylene, propylene, normal butylene and isobutylene.

The main products of the ethylenically unsaturated aliphatic nitriles are acrylonitrile from ethylene; methacrylonitrile and crotonitrile from propylene; 1-cyano-butene-1, 2-cyano-butene-1 and 2-cyano-butene-2 from normal butylene; and 1-cyano-2-methyl-propene-1 from isobutylene. Moreover, it is possible to by-produce propionitrile from ethylene; butyronitriles from propylene; valeronitrile from butylenes and acetonitrile in each case.

The volume ratio of the olefinic hydrocarbon to hydrogen cyanide in the starting gaseous mixture is preferably in the range of 1:20 to 20:1 and the volume ratio of oxygen to combined hydrogen cyanide and the olefinic hydrocarbon is preferably at most one.

In practising the process of the present invention, the presence of an inert gas or a relatively low reactive gas is not necessarily required but is not objectionable. Examples of inert gas or gas of low reactivity which may be present in a starting gas mixture include nitrogen, carbon dioxide, carbon monoxide, steam, methane, ethane, propane and butane.

The catalysts according to the present invention include the oxides of rhodium selected from the group consisting of RhO, $Rh_2O_3$, $RhO_3$ and $RhO_2$; the hydroxides of palladium and rhodium selected from the group consisting of $Pd(OH)_2$, $Pd(OH)_4$, $Rh(OH)_3$ and $Rh(OH)_4$; the chlorides of palladium and rhodium selected from the group consisting of PdCl, $PdCl_2$, $PdCl_3$, $PdCl_4$, $RhCl_2$ and $RhCl_3$; the bromides of palladium and rhodium selected from the group consisting of $PdBr_2$ and $RhBr_3$; the nitrates of palladium and rhodium selected from the group consisting of $Pd(NO_3)_2$ and $Rh(NO_3)_3$; $Pd(CN)_2$ and $Pd(OCOCH_3)_2$.

The use of a carrier is not essential but is preferable. The carrier may be any one that can be usually employed as carrier. Example of suitable carriers are silica, silica-alumina, alumina, active carbon, coke and diatomaceous earth.

The catalyst for use in the process of this invention may be prepared by supporting the component of the catalyst on a carrier by any of the conventional methods such as the immersing method, the mixing method or the heating method.

The temperature adopted for carrying out the process of the present invention is in the range of 200° C. to 500° C.

The pressure at which process is effected may be atmospheric. The reaction may also be effected under pressure.

The space velocity to be used in the present invention is preferably in the range of 20 hr.$^{-1}$ to 5,000 hr.$^{-1}$.

This invention will now be illustrated by the following examples in which percents are all by mol unless expressly stated to contrary.

DESCRIPTION OF THE PREFERRED EMBODIMENTS

Example 1

8.4 g. of $PdCl_2$ was dissolved in 200 ml. of a 1 N hydrochloric acid and 100 ml. of granular active carbon was immersed therein and the whole mixture was evaporated to dryness on a hot water bath. The resulting mixture was heated at 300° C. for 3 hours in a steam of hydrogen gas to reduce the $PdCl_2$ to metallic palladium. 10 ml. of this catalyst was filled into a U-shaped reaction tube of heat-resistance glass of 17 mm. inside diameter. The reaction tube was maintained at 315° C. and a gas mixture consisting of ethylene, hydrogen cyanide, oxygen, nitrogen and carbon dioxide at a volume ratio of 3:4:1:10:2 was introduced at a space velocity of 480 hr.$^{-1}$. As a result of reaction for 80 minutes, the yield of acryonitrile based on the introduced ethylene was 20.1% and the yiel dof propionitrile based on the introduced hydrogen cyanide was 13.0%.

Example 2

4.2 g. of $PdCl_2$ was dissolved in 200 ml. of a 1 N hydrochloric acid and 100 ml. of granular active carbon was immersed therein and the mixture was evaporated to dryness on a hot water bath. 5 ml. of this catalyst was mixed with 5 ml. of quartz sand and filled into the same reaction tube as in Example 1. The reaction tube was maintained at 250° C. and a gas mixture consisting of ethylene, hydrogen cyanide, oxygen and nitrogen at a volume ratio of 6:2:1:8 was introduced at a space velocity of 510 hr.$^{-1}$. As a result of reaction for one hour, the yields of acrylonitrile and propionitrile based on the introduced hydrogen cyanide were 16% and 1.8% respectively.

Example 3

8.4 g. of $PdCl_2$ was dissolved in 200 ml. of an aqueous hydrochloric acid solution and an aqueous ammonia solution was added until the hydrochloric acid was neutralized. The precipitates were filtered off and washed with water. 10 g. of this catalyst, i.e. $Pd(OH)_2$ was filled into the same reaction tube as in Example 1 and the reaction tube was maintained at 300° C. and a gas mixture consisting of ethylene, hydrogen cyanide and air at a volume ratio of 4:2:3 was introduced at a flow rate of 60 ml./min. As a result of reaction for one hour, the yields of acrylonitrile and propionitrile based on the introduced hydrogen cyanide were 1.7% and 0.3% respectively.

Example 4

5 g. of $Pd(CN)_2$ was dissolved in 500 ml. of an aqueous ammonia solution and 160 ml. of active carbon was immersed therein and the mixture was evaporated to dryness on a hot water bath. 10 ml. of this catalyst was filled into the same reaction tube as in Example 1. The reaction tube was maintained at 300° C. and a gas mixture consisting of propylene, hydrogen cyanide, air and propane at a volume ratio of 2:1:1:2 was introduced at a space velocity of 120 hr.$^{-1}$. As a result of reaction for one hour, the yields of acetonitrile, acrylonitrile, methacrylonitrile, isobutyronitrile, normal butyronitrile and crotononitrile based on the introduced hydrogen cyanide were 1.1%, 0.4%, 7.1%, 2.4%, 4.8% and 6.4%, respectively.

Example 5

10 ml. of the same catalyst as in Example 4 was filled into the same reaction tube as in Example 1. The reaction tube was maintained at 300° C. and a gas mixture consisting of normal butylene, hydrogen cyanide, air and nitrogen at a volume ratio of 3:1:1:2 was introduced at a space velocity of 120 hr.$^{-1}$. The normal butylene in the gas mixture had a purity of 80% and the mixture also contained normal butane and isobutane. As a result of reaction for one hour, the yields of acetonitrile, acrylonitrile, cyanobutenes and cyanobutane based on the introduced hydrogen cyanide were 4.1%, 2.3%, 6.8% and 8.1%, respectively.

Example 6

5 ml. of the same catalyst as in Example 2 was mixed with 5 ml. of quartz sand and filled into the same reaction tube as in Example 1. The reaction tube was maintained at 320° C. and a gas mixture consisting of isobutylene, hydrogen cyanide, air and nitrogen at a volume ratio of 2:1:1:1 was introduced at a space velocity of 550 hr.$^{-1}$. As a result of reaction for one hour, the yield of 1-cyano-2-methyl-propene-1 based on the introduced hydrogen cyanide was 10.3%.

Example 7

6.1 g. of $PdBr_2$ was added to 500 ml. of an aqueous 10% hydrogen bromide solution, and 100 ml. of active carbon were immersed therein and the mixture was evaporated to dryness on a hot water bath. 5 ml. of this catalyst was mixed with 5ml. of quartz sand and filled into the same reaction tube as in Example 1. The reaction tube was maintained at 250° C. and a gas mixture consisting of ethylene, hydrogen cyanide, air, nitrogen and steam at a volume ratio of 10:5:15:29:1 was introduced at a space velocity of 280 hr.$^{-1}$. As a result of reaction for one hour, the yields of acrylonitrile and propionitrile based on the introduced hydrogen cyanide were 3.1% and 2.3% respectively.

Example 8

100 ml. of pulverized coke was immersed in 200 ml. of an aqueous solution containing 4.0 g. of $RhCl_3$ and the mixture was evaporated to dryness on a hot water bath. 10 ml. of this catalyst was filled into the same reaction tube as in Example 1. The reaction tube was maintained at 300° C. and a gas mixture consisting of ethylene, hydrogen cyanide, air and nitrogen at a volume ratio of 2:1:2:5 was introduced at a space velocity of 240 hr.$^{-1}$. As a result of a reaction for one hour, the yields of acrylonitrile and propionitrile based on the introduced hydrogen cyanide were 2.1% and 0.4% respectively.

Example 9

5 ml. of the same catalyst as in Example 8 was mixed with 5 ml. of quartz sand and filled into the same reaction tube as in Example 1. The reaction tube was maintained at 350° C. and a gas mixture consisting of butylenes, hydrogen cyanide, air and nitrogen at a volume ratio of 3:1:1:2 was introduced at a space velocity of 200 hr.$^{-1}$. The butylenes in the gas mixture consisted of 50% by volume of normal butylene and 50% by volume of isobutylene. As a result of reaction for one hour, the yields of cyanobutenes and 1-cyano-2-methyl-propene-1 based on the introduced hydrogen cyanide were 3.5% and 3.1% respectively.

Example 10

150 ml. of granular active alumina was immersed in 200 ml. of an aqueous solution containing 5 g. of $Pd(NO_3)_2$ and the mixture was filtered off. 5 ml. of this catalyst was mixed with 5 ml. of quartz sand and filled into the same reaction tube as in Example 1. The reaction tube was maintained at 300° C. and a gas mixture consisting of ethylene, hydrogen cyanide, air and nitrogen at a volume ratio of 3:1:3:2 was introduced at a space velocity of 1020 hr.$^{-1}$. As a result of reaction for one hour, the yields of acrylonitrile and propionitrile based on the introduced hydrogen cyanide was 3.6% and 2.1% respectively.

Example 11

10 ml. of the same catalyst as in Example 10 was heated in air at 350° C. for 3 hours to decompose the $Pd(NO_3)_2$ to PdO. 10 ml. of this catalyst was filled into the same reaction tube as in Example 1 and the reaction tube was maintained at 320° C. A gas mixture consisting of ethylene, hydrogen cyanide, air and nitrogen at a volume ratio of 1:1:2:6 was introduced at a space velocity of 640 hr.$^{-1}$. As a result of reaction for one hour, the yields of acetonitrile, acrylonitrile and propionitrile based on the introduced hydrogen cyanide were 1.7%, 3.8% and 4.3% respectively.

Example 12

100 ml. of silica gel powder was immersed in 200 ml. of an aqueous acetic acid solution containing 2.1 g. of $Pd(OCOCH_3)_2$ and the mixture was filtered off and the precipitates were dried at 50° C. in vacuo overnight. 15 ml. of this catalyst was filled into the same reaction tube as in Example 1 and the reaction tube was maintained at 250° C. A gas mixture consisting of ethylene, hydrogen cyanide, air and nitrogen at a volume ratio of 3:1:2:4 was introduced at a space velocity of 370 hr.$^{-1}$. As a result of reaction for 2 hours, the yields of acrylonitrile and propionitrile based on the introduced hydrogen cyanide were 5.1% and 1.5% respectively.

Example 13

2.1 g. of $PdCl_2$ was supported on 100 ml. of diatomaceous earth in the same manner as in Example 1. 10 ml. of this catalyst was filled into the same reaction tube as in Example 1 and the reaction tube was maintained at 350° C. A gas mixture consisting of ethylene, hydrogen cyanide, air and nitrogen at a volume ratio of 2:1:2:2 was introduced at a space velocity of 240 hr.$^{-1}$. As a result of reaction for one hour, the yields of acetonitrile, acrylonitrile and propionitrile based on the introduced hydrogen cyanide were 0.9%, 8.1% and 0.1% respectively.

Example 14

4.2 g. of $PdCl_2$ was dissolved in 200 ml. of a 1 N hydrochloric acid, and 100 ml. of alumina was immersed therein. The whole mixture was evaporated to dryness on a hot water bath. 5 ml. of the resulting catalyst was mixed with 5 ml. of quartz sand and charged into a reaction tube of quartz glass having 17 mm. inside diameter. A gas mixture consisting of ethylene, hydrogen cyanide, oxygen and nitrogen at a volume ratio of 2:2:1:8 was fed to the reaction tube maintained at a temperature between 200° C. and 500° C. at a space velocity of 500 hr.$^{-1}$. As a result of reaction for one hour the yields of acrylonitrile in mol percent based on the introduced hydrogen cyanide were shown in Table 1.

TABLE 1

| Temperature (° C.): | Yield of acrylonitrile (mol percent) |
|---|---|
| 200 | 1.1 |
| 220 | 3.0 |
| 250 | 5.3 |
| 300 | 12.3 |
| 350 | 23.4 |
| 400 | 9.1 |
| 470 | 3.0 |
| 500 | 1.3 |

Example 15

4.2 g. of $PdCl_2$ was dissolved in 100 ml. of a 1 N hydrochloric acid, and 50 ml. of granular active carbon was immersed therein and the mixture was evaporated to dryness on a hot water bath and reheated. 5 ml. of this catalyst, i.e. PdCl was mixed with 5 ml. of quartz sand and filled into the same reaction tube as in Example 1. The reaction tube was maintained at 250° C. and a gas mixture consisting of ethylene, hydrogen cyanide, oxygen and nitrogen at a volume ratio of 6:2:1:8 was introduced at a space velocity of 510 hr.$^{-1}$. As a result of reaction for one hour, the yields of acrylonitrile and propionitrile based on the introduced hydrogen cyanide were 15.9% and 1.6% respectively.

Example 16

2.5 g. of metallic palladium was dissolved in 100 ml. of aqua regia and 50 ml. of granular active carbon and the mixture was evaporated to dryness. 5 ml. of this catalyst, i.e. $PdCl_4$ was mixed with 5 ml. of quartz sand and filled into the same reaction tube as in Example 1. The reaction tube was maintained at 250° C. and a gas mixture consisting of ethylene, hydrogen cyanide, oxygen and nitrogen at a volume ratio of 6:2:1:8 was introduced at a space velocity of 510 hr.$^{-1}$. As a result of reaction for one hour, the yields of acrylonitrile and propionitrile based on the introduced hydrogen cyanide were 16.1% and 1.7% respectively.

Examples 17 to 28

5 ml. of the catalyst was mixed with 5 ml. of quartz sand and filled into a reaction tube of heat-resistance glass having 17 mm. inside diameter. A gas mixture having a specified composition at a specified volume ratio was fed into the reaction tube maintained at a temperature between 280° C. and 450° C. at a space velocity between 220 hr.$^{-1}$ and 640 hr.$^{-1}$. The reaction conditions and results are shown in Table 2.

TABLE 2

| Example No. | Catalyst | G./100 ml. carrier | Carrier | Reaction temperature (° C.) | Space velocity (hr.$^{-1}$) | $C_2H_4$ | HCN | $O_2$ | $N_2$ | Air | Acrylonitrile | Propionitrile |
|---|---|---|---|---|---|---|---|---|---|---|---|---|
| 17 | $Pd(OH)_2$ | 1.4 | $SiO_2$ | 350 | 300 | 4 | 3 | | | 3 | 6.2 | 1.5 |
| 18 | $Pd(OH)_4$ | 1.7 | $SiO_2$ | 350 | 300 | 4 | 3 | | | 3 | 5.9 | 1.6 |
| 19 | $PdCl_3$ | 2.1 | Active carbon | 250 | 510 | 6 | 2 | 1 | 8 | | 16.2 | 1.5 |
| 20 | RhO | 1.2 | $Al_2O_3$ | 450 | 520 | 3 | 1 | | 2 | 2 | 4.5 | 0.8 |
| 21 | $Rh_2O_3$ | 2.5 | $Al_2O_3$ | 450 | 520 | 3 | 1 | | 2 | 2 | 4.2 | 0.82 |
| 22 | $RhO_2$ | 1.4 | $Al_2O_3$ | 450 | 520 | 3 | 1 | | 2 | 2 | 4.3 | 0.79 |
| 23 | $RhO_3$ | 1.5 | $Al_2O_3$ | 450 | 520 | 3 | 1 | | 2 | 2 | 4.2 | 0.77 |
| 24 | $Rh(OH)_3$ | 1.5 | Active carbon | 350 | 220 | 5 | 1 | | | 5 | 3.9 | 1.2 |
| 25 | $Rh(OH)_4$ | 1.7 | do | 350 | 220 | 5 | 1 | | | 5 | 4.0 | 1.1 |
| 26 | $Rh(NO_3)_3$ | 2.9 | $SiO_2$ | 280 | 270 | 3 | 2 | 1 | 2 | | 3.4 | 0.8 |
| 27 | $RhCl_2$ | 1.7 | Active carbon | 300 | 240 | 2 | 1 | | 5 | 2 | 2.2 | 0.35 |
| 28 | $RhBr_3$ | 3.4 | $SiO_2$ | 360 | 320 | 1 | 1 | | | 1 | 3.1 | 0.5 |

*Yields of products in mol percent based on the introduced hydrogen cyanide as a result of reaction for one hour.

What is claimed is:

1. A process for the production of at least one ethylenically unsaturated aliphatic nitrile selected from the group consisting of acrylonitrile, methacrylonitrile, crotononitrile, 1-cyanobutene-1, 2-cyano-butene-1, 2-cyanobutene-2 and 1-cyano-2-methylpropene-1, said process comprising reacting at least one olefinic hydrocarbon containing 2 to 4 carbon atoms selected from the group consisting of ethylene, propylene, normal butylene and isobutylene with hydrogen cyanide and a gas selected from the group consisting of oxygen and molecular oxygen containing gases in the gaseous phase in the presence of a catalyst selected from the group consisting of the oxides of rhodium selected from the group consisting of RhO, $Rh_2O_3$, $RhO_3$ and $RhO_2$; the hydroxides of palladium and rhodium selected from the group consisting of $Pd(OH)_2$, $Pd(OH)_4$, $Rh(OH)_3$ and $Rh(OH)_4$; the chlorides of palladium and rhodium selected from the group consisting of PdCl, $PdCl_2$, $PdCl_3$, $PdCl_4$, $RhCl_2$ and $RhCl_3$; the bromides of palladium and rhodium selected from the group consisting of $PdBr_2$ and $RhBr_3$; the nitrates of palladium the group consisting of $PdBr_2$ and $RhBr_3$; the nitrates of palladium and rhodium selected from the group consisting of $Pd(NO_3)_2$ and $Rh(NO_3)_3$; $Pd(CN)_2$ and $Pd(OCOCH_3)_2$ at a temperature of 200° C. to 500° C.

2. A process according to claim 1 wherein the catalyst is supported on a carrier selected from the group consisting of silica, silica-alumina, alumina, active carbon, coke and diatomaceous earth.

3. A process according to claim 1 wherein the reaction is effected in the presence of at least one gas selected from the group consisting of nitrogen, carbon monoxide, carbon dioxide, steam, methane, ethane, propane and butane.

4. A process according to claim 1 wherein the olefinic hydrocarbon containing 2 to 4 carbon atoms and the hydrogen cyanide are present in a volume ratio of 1:20 to 20:1 and the oxygen is present in an amount of at most one volume per volume of combined hydrogen cyanide and olefinic hydrocarbon containing 2 to 4 carbon atoms.

5. A process according to claim 1 wherein a gaseous mixture of the olefinic hydrocarbon containing 2 to 4 carbon atoms, hydrogen cyanide and the oxygen containing gas is passed on the catalyst at a space velocity between 20 hr.$^{-1}$ and 5,000 hr.$^{-1}$.

References Cited
UNITED STATES PATENTS 3,347,900 10/1967 Gossel et al. _____ 260—465.3
3,470,230 9/1969 Hirsch et al. _____ 260—465.3

JOSEPH PAUL BRUST, Primary Examiner

UNITED STATES PATENT OFFICE
CERTIFICATE OF CORRECTION

Patent No. 3,574,701              Dated March 16, 1971

Inventor(s)   Naoya Kominami et al.

It is certified that error appears in the above-identified patent and that said Letters Patent are hereby corrected as shown below:

In the heading to the printed specification, lines 5 and 6 "assignors to Asachi Kasei Kogyo Kabushiki Kaisha, Asaka, Japan should read -- assignors to Asahi Kasei Kogyo Kabushiki Kaisha Asaka, Japan --.

Signed and sealed this 22nd day of February 1972.

(SEAL)
Attest:

EDWARD M. FLETCHER, JR.                ROBERT GOTTSCHALK
Attesting Officer                      Commissioner of Patents